United States Patent
Meier et al.

(10) Patent No.: US 12,535,024 B2
(45) Date of Patent: Jan. 27, 2026

(54) METHOD FOR EXHAUST GAS AFTER-TREATMENT OF AN INTERNAL COMBUSTION ENGINE HAVING AT LEAST ONE SCR CATALYST

(71) Applicant: Robert Bosch GmbH, Stuttgart (DE)

(72) Inventors: Thorsten Meier, Pfinztal-Kleinsteinbach (DE); Arman Khosravani, Freiberg Am Neckar (DE); Stefanos Tzivanakis, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/981,582

(22) Filed: Dec. 15, 2024

(65) Prior Publication Data
US 2025/0207521 A1    Jun. 26, 2025

(30) Foreign Application Priority Data
Dec. 22, 2023 (DE) .................. 10 2023 213 243.5

(51) Int. Cl.
*F01N 3/20* (2006.01)
*F01N 9/00* (2006.01)

(52) U.S. Cl.
CPC ............. *F01N 3/208* (2013.01); *F01N 9/005* (2013.01); *F01N 9/007* (2013.01); *F01N 2560/021* (2013.01); *F01N 2560/07* (2013.01); *F01N 2570/14* (2013.01); *F01N 2610/02* (2013.01); *F01N 2900/04* (2013.01);
(Continued)

(58) Field of Classification Search
CPC ........ F01N 3/2066; F01N 3/208; F01N 9/005; F01N 9/00; F01N 9/007; F01N 11/005; F01N 1/007; F01N 13/0093; F01N 2560/021; F01N 2560/026; F01N 2560/07; F01N 2570/14; F01N 2610/02; F01N 2900/04; F01N 2900/0406; F01N 2900/0412; F01N 2900/1402; F01N 2900/1406; F01N 2900/1411; F01N 2900/1602; F01N 2900/1614;
(Continued)

(56) References Cited

U.S. PATENT DOCUMENTS 6,470,675 B1 * 10/2002 Lewis ................. F02D 41/1475
                                                                60/285
9,506,390 B1 * 11/2016 Hendrickson ....... F02D 41/0235
(Continued)

*Primary Examiner* — Binh Q Tran
(74) *Attorney, Agent, or Firm* — Maginot, Moore & Beck LLP

(57) ABSTRACT

A method is for exhaust aftertreatment of an internal combustion engine having at least one selective catalytic reduction ("SCR") catalyst supplied with exhaust gas of the engine. The method includes virtually dividing the SCR catalyst into n-bricks in a direction of flow of the exhaust gas, and determining desired NH3 target fill levels for the SCR catalyst as a function of a desired target NOx conversion efficiency. The method further including assuming a steady state condition for the determination of the desired NH3 target fill levels, and determining the desired NH3 target fill levels for the at least one SCR catalyst by an inverse SCR model of a current NOx concentration upstream of the SCR catalyst, an SCR catalyst temperatures of the bricks, an exhaust mass flow, an oxygen concentration, an exhaust pressure upstream of the SCR catalyst and a desired target NOx conversion efficiency.

12 Claims, 2 Drawing Sheets

(52) U.S. Cl.
CPC ............... *F01N 2900/0406* (2013.01); *F01N 2900/1406* (2013.01); *F01N 2900/1411* (2013.01); *F01N 2900/1602* (2013.01); *F01N 2900/1614* (2013.01); *F01N 2900/1621* (2013.01); *F01N 2900/1622* (2013.01)

(58) Field of Classification Search
CPC ..... F01N 2900/1616; F01N 2900/1621; F01N 2900/1622; Y02T 10/12
See application file for complete search history.

(56) References Cited

U.S. PATENT DOCUMENTS

| | | | |
|---|---|---|---|
| 2009/0049827 A1* | 2/2009 | Wei | F01N 3/208 60/286 |
| 2011/0005209 A1* | 1/2011 | Gady | F01N 3/103 60/331 |
| 2012/0310507 A1* | 12/2012 | Auckenthaler | F01N 3/208 701/102 |
| 2018/0008932 A1* | 1/2018 | Quigley | B01D 53/9495 |
| 2021/0123367 A1* | 4/2021 | Fritsch | F01N 3/208 |
| 2022/0213823 A1* | 7/2022 | Ramirez | B60W 10/06 |

* cited by examiner

METHOD FOR EXHAUST GAS AFTER-TREATMENT OF AN INTERNAL COMBUSTION ENGINE HAVING AT LEAST ONE SCR CATALYST

This application claims priority under 35 U.S.C. § 119 to patent application no. DE 10 2023 213 243.5, filed on Dec. 22, 2023 in Germany, the disclosure of which is incorporated herein by reference in its entirety.

BACKGROUND

Selective catalytic reduction (SCR) using ammonia (NH3) or ammonia-releasing reagents is a promising method for mitigating nitrogen oxides in oxygen-rich exhaust gases. The working window of an SCR catalyst 22 or its efficiency is defined via the physical variables of temperature and space velocity. The degree of coverage of the catalyst with adsorbed NH3 determines its efficiency. As the temperature increases, the ability of SCR catalyst 22 to store ammonia decreases. In order to maintain high levels of efficiency, the amount of ammonia to be converted must be dosed instantaneously to the measured amount of nitrogen oxide upstream of the SCR catalyst. Ammonia that does not react with NOx, that is desorbed as ammonia slip from the catalyst or that is oxidized by the high temperature on the catalyst, must also be dosed. In order to achieve the highest nitrogen oxide conversion rate possible, the SCR system must operate at a high ammonia fill level. As the temperature of the filled SCR catalyst 22 increases due to a load jump of the internal combustion engine, its ammonia storage capacity of the SCR catalyst 22 decreases, which may result in ammonia slip. SCR catalysts that are installed close to the engine to convert nitrogen oxides early after the engine starts are particularly subject to dynamic temperature gradients. This fact can lead to increased NH3 desorption depending on NH3 fill level load and/or its gradients. A second SCR catalyst downstream of the first SCR catalyst 22 may therefore be provided in the exhaust system to adsorb and subsequently convert ammonia from ammonia slip of the first catalyst. The Onboard Diagnostic (OBD) guidelines require that both SCR catalysts be monitored.

SUMMARY

In a first aspect, the disclosure relates to a method for exhaust aftertreatment of an internal combustion engine having at least one SCR catalyst supplied with exhaust via an exhaust path of an internal combustion engine, wherein the at least one SCR catalyst is virtually divided into i-bricks in the direction of flow of the exhaust gas, wherein desired NH3 target fill levels for the at least one SCR catalyst are determined as a function of a desired target NOx conversion efficiency, wherein a steady state condition is assumed to determine the desired NH3 target fill levels, wherein the desired NH3 target fill levels for the at least one SCR catalyst are determined by means of an inverse SCR model by means of a current NOx concentration upstream of the SCR catalyst, an SCR catalyst temperature, in particular SCR catalyst temperatures of the bricks, an exhaust mass flow rate, an oxygen concentration, an exhaust pressure upstream of the SCR catalyst NO, and a desired target NOx conversion efficiency, wherein a regulation of the SCR catalyst is performed as a function of the determined NH3 target fill level.

The advantage of this method is that, when there is a motor load jump (operating point change) that leads to an increase in the temperature in the SCR catalyst or to dynamic temperature gradients, a high NOx/NH3 conversion can still be ensured. In contrast to a level-based regulation that compares only the actual NH3 with the target NH3 fill level, the method presented here may provide different target variables that are calculated based on efficiency. Thus, the efficiency-based method presented, results in a higher overall fill level, which does not lead to a pause in dosing. By recursively calculating the efficiency-based target level, current motor operating points can be included in the calculation. Thus, the method may be used to improve emissions cleaning.

In a further embodiment, for the assumed steady state, a balancing of the input and output concentrations of the at least one SCR catalyst based on the NH3 fill level is described as follows:

$$\frac{\partial m_{NH3,i}}{\partial t} = 0 = -\xi x^{ds}_{NOx,i-1} \eta_{NOx,i} + x^{ds}_{NH3,i-1} - x^{ds}_{NH3,i},$$

with $\eta_{NOx,i}$ the NOx conversion efficiency of the i-th brick, and $\xi$ a stoichiometric factor corresponding to the NH3 equivalents from the NOx conversion, and in particular in the range of (1:1.3).

The advantage of the steady state condition is that it provides an unambiguous solution for the fill level distribution. Without this condition, there would be endless possible solutions, some of which could also be non-physical.

In a particular configuration, an NH3 dosing quantity is determined as a function of a difference between the desired NH3 target fill level and a current NH3 fill level and dosed using the SCR injection system.

This regulation quickly guides the SCR system to its desired operating point. Thus, harmful emissions can be reduced.

In an alternative configuration, the desired NOx conversion efficiency is determined or specified from a grid as a function of the SCR catalyst temperature and/or exhaust mass flow.

In a particular embodiment, the inverse SCR model is determined using a reaction kinetic or a site-resolved model.

The use of an inverse model has the particular advantage that in the inverse model, all physical quantities are taken into account, if they are used in the model. Consequently, this approach allows the NH3 target fill level to be specified depending on the operating and catalyst state, which ensures a higher NOx conversion in certain situations.

In an advantageous embodiment, the desired NH3 target fill level is composed of the sum of the desired NH3 target fill levels of the n virtual bricks.

By dividing over the virtual bricks, the internal states of the SCR catalyst or those of the SCR model can thus be used as target variables. Thus, more precise information is available for the SCR catalyst so that improved emissions cleaning can be carried out.

In a further embodiment, the regulation is carried out on any virtual brick, in particular on the first brick.

In a particular configuration, the overall NOx conversion efficiency of the SCR catalyst is determined as a function of the NOx conversion efficiencies of the individual virtual bricks according to the formula:

$$\eta_{NOx,ges} = 1 - \prod_{1}^{n_b}(1 - \eta_{NOx,i}).$$

In an advantageous configuration, two SCR catalysts are arranged sequentially in the direction of flow of the exhaust gas, wherein the desired NOx conversion efficiency is determined as a function of the state of the second catalyst, wherein an actual NOx conversion efficiency and/or actual NH3 individual levels and/or total actual NH3 level are used for the calculation.

This has the particular advantage that the states from the entire exhaust system are efficiently processed to the target NOx conversion efficiency and indirectly transferred to the inverse model via this variable. Thus, the inverse model does not need to be constantly adjusted to a new target NOx conversion efficiency. This is an intuitive approach.

In further aspects, the disclosure relates to a device, in particular a control unit and a computer program configured, in particular programmed, to carry out any one of the methods. In yet another aspect, the disclosure relates to a machine-readable storage medium on which the computer program is stored.

BRIEF DESCRIPTION OF THE DRAWINGS

The disclosure will be explained in more detail in the following with reference to an exemplary embodiment shown in the figures. The figures show.

DETAILED DESCRIPTION

Figure 1:
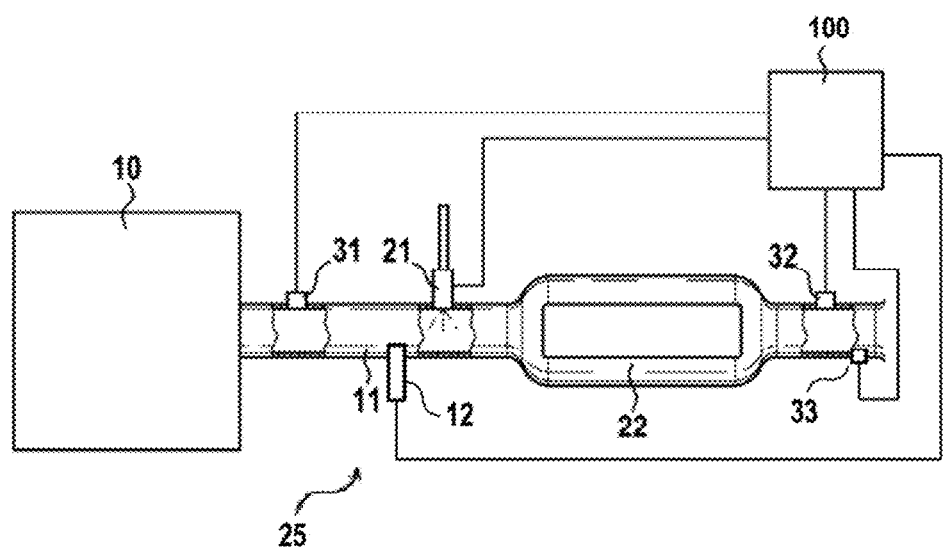
FIG. 1 a schematic illustration of an internal combustion engine having an exhaust gas aftertreatment system according to the disclosure.

An internal combustion engine 10 has an SCR exhaust aftertreatment system 25 with at least one SCR catalyst 22 in its exhaust gas line 11, which is shown in FIG. 1. This has a reducing agent dosing unit 21 with which a urea solution (AdBlue) can be injected into the exhaust gas line 11. Ammonia is released from this at the high temperatures of the exhaust gas. A first SCR catalyst 22 is arranged downstream of the reducing agent dosing unit 21. Further SCR catalysts may be arranged downstream of the first SCR catalyst 22. A first NOx sensor f and a temperature sensor 12 are arranged upstream of the reducing agent dosing unit 21 and downstream of an internal combustion engine 10 in the exhaust gas line 11. The first NOx sensor 31 measures a first NOx concentration sensor value NOx1, preferably as an NOx concentration or as an NOx mass flow. A second NOx sensor 32 is arranged downstream of the first SCR catalyst 22 and thereby measures a second NOx concentration sensor value NOx2, preferably as an NOx concentration or as an NOx mass flow. This also applies in particular to the NH3 concentration or an NH3 mass flow.

In an optional configuration, an NH3 sensor 33 may further be installed downstream of SCR catalyst 22. The NH3 sensor may thereby determine an NH3 mass flow.

All NOx sensors 31, 32 relay their signals to an electronic control unit 100. As NOx sensors 31, 32 are also cross-sensitive to ammonia in addition to nitrogen oxides, their signals are sum signals of nitrogen oxides and ammonia. The first NOx sensor 31 is arranged upstream of the reducing agent dosing unit 21 so that it reliably only measures the quantity of nitrogen oxide in the exhaust gas. The reducing agent dosing unit 21 also reports the amount of ammonia dosed into exhaust gas line 11 to the control unit 100.

Furthermore, an SCR model F for the SCR catalyst 22 is stored on the control unit 100, which divides the SCR catalyst 22 into n virtual bricks, with n=1 ... $n_b$, i∈ N. The SCR catalyst 22 is modeled using a multi-slice model, wherein the current fill level amount $m_{NH3,i}$ is determined for each virtual brick. Preferably, the fill level amounts correspond to NH3 fill level amounts.

Furthermore, an exhaust gas mass flow $dm_{EG}$, an exhaust gas pressure p, an exhaust gas temperature T, an oxygen concentration $O_2$ downstream of the internal combustion engine 10 and upstream of the SCR catalyst 22, and dosing quantity information are determined.

In particular, depending on the determined exhaust gas temperature T, a brick temperature $T_{exh,i}$ is determined for each brick n of the SCR catalyst 22 by means of a temperature model stored on the control unit 100 and used as an input variable for the SCR model F.

The disclosure relates to a method for determining a target NH3 fill level $m_{NH3_{Soll}}$ for operating the SCR catalyst 22 depending on a desired nitrogen oxide (NOx) conversion rate $\eta_{NOx}$. The actual NH3 fill level $m_{NH3_{1st}}$ is typically approximated by a model and cannot be directly measured. The physical models may account for a fill level distribution in the longitudinal direction of the catalyst depending on the application and complexity.

This type of operating point determination under certain boundary conditions may avoid an interruption in Adblue dosing, which can occur when the current NH3 fill level drops towards a lower NH3 target fill level, and thus ensure higher nitrogen oxide conversion.

The operating point of an SCR catalyst is largely determined by the amount of adsorbed ammonia (NH3 fill level). The ability of the SCR catalyst 22 to store ammonia is significantly influenced by the temperature of the catalyst T.

The disclosure relates to function that allocates a desired NOx conversion efficiency $\eta_{NOx}$ to an NH3 fill level of the catalyst assuming a steady state in a steady state, thus establishing the target NH3 fill level $m_{NH3}$ of the SCR catalyst 22 for this NOx conversion efficiency $\eta_{NOx}$ $$m_{NH3} = F^{-1}(\eta_{NOx}), \tag{1}$$

wherein, when considering a multi-brick model, $$m_{NH3} = \sum_i m_{NH3,i} = \sum_i f_i^{-1}(\tilde{\eta}_{Nox,i}), \tag{2}$$

$$i = 1, \ldots, n_b$$

and $n_b$ defines the number of bricks.

The target NH3 distribution in the longitudinal direction of the SCR catalyst 22 is described by the target NH3 individual fill levels $m_{NH3,i}$.

Here, $F^{-1}$ corresponds to an inversion of a physical SCR model F.

Figure 2:
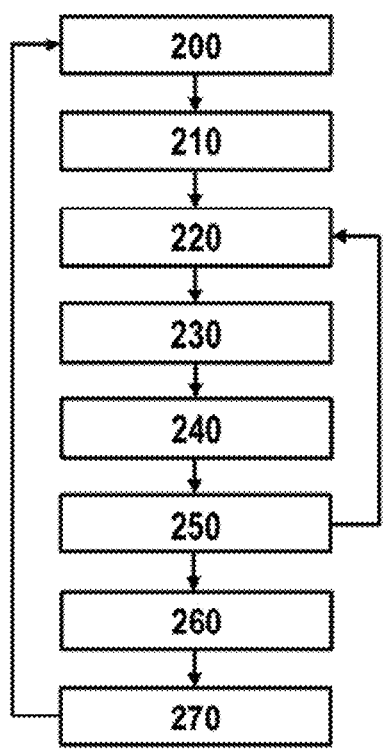
FIG. 2 a flow chart for graphically representing the flow of an exemplary embodiment of the method.

A clear overview of the inputs and outputs of the SCR model F and the inverted SCR model functionality is provided in FIG. 2.

Formally, the SCR model F can be defined as a function of physical variables such as, for example T, the exhaust gas temperature, the exhaust gas mass flow $dm_{EG}$, the NH3 dosing quantity $x_{NH3}^{us}$ (us: upstream), the NOx concentration $x_{NOx}^{us}$ of the oxygen concentration $x_{O2}$, the exhaust gas pressure p and the NH3 filling levels.

For example, reaction kinetic models may be used to calculate the SCR model. The concentration of NOx $x_{Nox}^{ds}$ and NH3 $x_{NH3}^{ds}$ downstream of SCR catalyst 22 (ds: downstream) may be calculated or estimated for a particular NH3 fill level of the SCR catalyst 22 and AdBlue dosing.

$$x_{NOx,i}^{ds} = r_{NOx}(m_{NH3,i}, T_{SCR,i}, dm_{EG}, x_{NH3,i-1}^{ds}, x_{NOX,i-1}^{ds}, x_{O2}, p) \quad (3)$$

$$x_{NH3,i}^{ds} = r_{NH3}(m_{NH3,i}, T_{SCR,i}, dm_{EG}, x_{NH3,i-1}^{ds}, x_{NOX,i-1}^{ds}, x_{O2}, p) \quad (4)$$

with $x_{k,0}^{ds} = x_k^{us}$ (k corresponds to NOx or NH3), $r_{NOx}$ function for calculating the NOx concentrations, $r_{NH3}$ function for calculating the NH3 concentrations, $m_{NH3,i}$-th NH3 mass, temperature of $T_{scR,i}$ the i-th brick, the NH3 concentration $x_{NH3,i-1}^{ds}$ of the previous brick, $x_{NOX,i-1}^{ds}$ the NOx concentration of the previous brick, $x_{O2}$ the oxygen concentration and p the exhaust gas pressure.

Consequently, the NOx conversion efficiency may be determined as follows, depending on the $$\eta_{NOx,i} = 1 - \frac{x_{NOx,i}^{ds}}{x_{NOx,i-1}^{ds}} \quad (5)$$

stated variables. The total conversion of the SCR catalyst 22 is given by:

$$\eta_{NOx} = 1 - \prod_{1}^{n_b}(1 - \eta_{NOx,i}) \quad (6)$$

The condition of steady state may be described by balancing the input and output concentrations (NOx and NH3) of the SCR catalyst 22 using the NH3 fill level:

$$\frac{\partial m_{NH3,i}}{\partial t} = 0 = -\xi x_{NOx,i-1}^{ds} \eta_{NOx,i} + x_{NH3,i-1}^{ds} - x_{NH3,i}^{ds} + \varphi \quad (7)$$

wherein $\xi$ is the stoichiometric factor corresponding to the NH3 equivalents from the NOx conversion and is in the range of (1:1.3). The factor $\varphi$ may stand for further NH3 sources, e.g. NH3 oxidation. Further, $$x_{NH3}^{us} = \xi x_{NOx}^{us} \eta_{NOx} + x_{NH3,n_b}^{ds}. \quad (8)$$

In the case of $n_b = 1$, taking into account equation (8), the right side of equation (7) equals zero. The inversion of the SCR guide model then relates solely to equation (3). Depending on the complexity of the functional relationship of the function of the NOx concentration, an analytical solution for the inversion $r_{NOx}$ may be provided.

As an example, the functional relationship is given here for $r_{NOx}$ and i=1 based on a linear NOx conversion reaction as follows:

$$r_{NOx} = x_{NOx}^{us} \exp\left(-\tau(dm_{EG}, p, T) \cdot k_{NOx}(T) \cdot \frac{m_{NH3}}{m_{NH3}^{max}}\right), \quad (9)$$

wherein $m_{NH3}^{max}$ describes the maximum possible NH3 fill level. The dwell time $\tau$ may be determined from physical variables T, p, $dm_{EG}$ and the catalyst-specific volume. A reaction rate of NOx conversion is given by $k_{NOx}$ and may be calculated from the reaction kinetic approach of the Arrhenius equation, which is dependent on temperature.

Finally, if equation (5) is switched $x_{NH3, i}^{ds}$ to and combined with equation (9), the inverted function $F^{-1}$ for the 1-Brick case can be specified:

$$F^{-1}(\eta_{NOx}) = \left(\frac{m_{NH3}^{max}}{\tau(dm_{EG}, p, T) \cdot k_{NOx}(T)}\right) \ln\left(\frac{1}{1 - \eta_{NOx}}\right) \quad (10)$$

This equation can be adapted for the corresponding target variables and the desired target NH3 fill level $NH3_{soll}$ results from equation (1).

In the case of more complex models and/or for $n_b > 1$, a recursive method is useful to solve the equation (1).

According to equation (7), the iterative solution corresponds to a minimization problem and can be solved using numerical optimization methods, such as Newton methods, pseudo-Newton, etc.

For numerical methods, it is not necessary to determine the absolute target value but rather to $\epsilon_{tol}$ specify or fall below a suitable tolerance threshold in order to save computing time. That is to say, according to equation (7), the condition $$(-\xi x_{NOx,i-1}^{ds} \eta_{NOx,i} + x_{NH3,i-1}^{ds} - x_{NH3}^{ds}) \leq \epsilon_{tol} \quad (11)$$

must be met.

For example, in the context of this disclosure, it is sufficient to define a stationary state with a $\partial_t m_{NH3,i} \leq 1$ mg/s.

It should be noted that, from a physical point of view, the filling levels in the stationary state in a multi-disc model are monotonically decreasing in the longitudinal direction. The resulting fill level gradient is determined in large part by $x_{Nox}^{us}$ or the NH3 oxdiation (if considered). The total fill level is calculated as indicated in equation (2).

In the numeric minimization, the left side of the equation (11) is recursively calculated starting from a starting value $m_{NH3,i}^{[0]}$ to obtain further estimates for $m_{NH3, i}^{[l]}$, wherein l corresponds to the iterative run number.

If the condition of equation (11) is satisfied, the calculation ends after the l-th iteration.

Depending on the method, the way in which the currently estimated target NH3 fill level $m_{NH3,i}^{[l]}$, is incremented differs.

For example, in Newton-based methods, the derivative matrix (Jacobi matrix) of the function to be minimized is used which, for equation (11), results in $$J = \left[\frac{\partial}{\partial m_{NH3,j}}\left(\frac{\partial m_{NH3,i}}{\partial t}\right)\right], i, j = 1, \ldots, n_b \text{ und } J \in \mathbb{R}^{n_b \times n_b} \quad (12)$$

Furthermore, with an iterative process, it is necessary to start with a suitable start value. To this end, an approximated analytical solution may be used, as provided in equation (10). It must be considered to what extent the model to be inverted can be approximated in a 1-brick solution in order to estimate an initial value.

Solving the iterative approach provides the same result for NOx conversion efficiency $\eta_{NOx}$ by insertion into the SCR model F.

In order to ensure a minimum total target fill level, it is necessary to make a maximum selection between the fill level calculated from the method and a minimum specification.

Further, it may be necessary that the NOx concentration $x_{Nox}^{us}$ downstream of the SCR catalyst 22 and the exhaust mass flow $dm_{EG}$ also exceed a minimum value.

Particularly for the latter variable, very low fill levels can result for small values (e.g. empty run).

Further, the method could be combined with the secondary condition of limiting the expected ammonia slip at high conversion rates.

FIG. 2 illustrates, as an example, the procedure of the method for an exhaust aftertreatment system having only one SCR catalyst 22, wherein the SCR catalyst 22 is virtually divided into n-bricks.

In a step 200 $dm_{EG}$, an exhaust mass flow, an exhaust pressure $p$, an SCR catalyst temperature $T_{SCR}$, an oxygen concentration $O_2$, a NOx concentration $NOx_{US}$ downstream of the internal combustion engine 10, and upstream of the SCR catalyst 22, and a desired NOx conversion efficiency $\eta_{NOx}$ are continuously determined by the control unit 100.

In particular, depending on the determined exhaust gas temperature $T_{exh}$, a brick temperature $T_{scR,i}$ is determined for each brick of the SCR catalyst 22 by means of a temperature model stored on the control unit 100.

The desired NOx conversion efficiency $\eta_{NOx}$ may be determined or specified from a grid depending on the SCR catalyst temperature $T_{SCR}$ and/or exhaust mass flow $dm_{EG}$. The grid is determined in an application phase and stored in the control unit 100.

In an alternative configuration, two SCR catalysts (cannings) are positioned in a row. In this configuration, the desired target NOx conversion efficiency may $\eta_{NOx}$ also be determined as a function of the state of the second catalyst. Here, the variables of actual NOx conversion efficiency $\eta_{NOx,1st}$ and/or actual NH3 individual fill levels $m_{NH3,1St,i}$ and/or the actual NH3 fill level may be $m_{NOx,ges}$ used.

The method is then continued in a step 210.

In a first step 210, an enabling condition for the method is reviewed. To this end, a dosing readiness for the SCR injection system is determined by the control unit 100. This is primarily done via the feedback of the pressure p reported by the pump unit. If the pressure p of the SCR injection system determined by the control unit 100 exceeds a specifiable pressure threshold, the SCR injection system is thus ready for dosing.

Additionally, the SCR catalyst temperature $T_{SCR}$ of the SCR catalyst 22 may be determined by the control unit 100. If the SCR catalyst temperature exceeds $T_{SCR}$ a specifiable temperature $T_{Kat,min}$, particularly 180° C., the operating temperature for the SCR catalyst 22 is reached and the enabling condition is granted.

The method then continues in a step 220.

In a step 220, a start value for the method is determined. Preferably, this is an estimate.

In a first embodiment, the start value may be determined from a solution of the inverse model $F^{-1}$ at a previous time t−1, wherein this approach is based on the condition that no abrupt changes in NOx and NH3 concentration occur within periods of less than 100 ms from this time.

In a second embodiment, the start value is determined based on a current actual NH3 fill level distribution $NH3_{1st}$ for the SCR catalyst 22. The current actual NH3 fill level distribution $NH3_{1st}$ is calculated using the SCR model F and the continuously determined variables from the step 200.

In a third embodiment, a target total NH3 level $NH3_{ges}$ from a replacement model is used, preferably a characteristic line stored on the control unit 100, wherein the target total NH3 level is $NH3_{ges}$ evenly distributed across the SCR catalyst 22.

In a fourth embodiment, the start value may be determined from a calculation for an SCR catalyst 22 with only one brick. For this purpose, the inverse model $F^{-1}$ is analytically solved for the one brick case and a target total NH3 level $NH3_{ges}$ is obtained for the SCR catalyst 22. This total NH3 target fill level $NH3_{ges}$ is then distributed across the SCR catalyst 22.

Thus, a start value for the method may be determined and the method may be continued in a step 230.

In a step 230, the NOx concentrations and the NH3 concentrations are then iteratively solved according to the formulas (3) and (4):

$$x_{NOx,i}^{ds} = r_{NOx}(m_{NH3,i}, T_{SCR,i} dm_{EG}, x_{NH3,i-1}^{ds}, x_{NOx,i-1}^{ds}, x_{O2}, p) \quad (3)$$

$$x_{NH3,i}^{ds} = r_{NH3}(m_{NH3,i}, T_{SCR,i}, dm_{EG}, x_{NH3,i-1}^{ds}, x_{NOx,i-1}^{ds}, x_{O2}, p) \quad (4)$$

with $x_{k,0}^{ds} = x_k^{us}$, $r_{NOx}$ the function for calculating NOx concentrations, $r_{NH3}$ the function for calculating NH3 concentrations, $m_{NH3,i}$ i-th NH3 mass, $T_{SCR,i}$ the temperature of the i-th brick, the NH3 concentration $x_{NH3,i-1}^{ds}$ of the previous brick, $x_{NOx,i-1}^{ds}$ the NOx concentration of the previous brick, $x_{O2}$ the oxygen concentration and p the exhaust gas pressure.

The method then continues in a step 240.

In a step 240, a balancing of the NOx and NH3 concentrations upstream and downstream of each brick i is determined according to the formula (7):

$$\frac{\partial m_{NH3,i}}{\partial t} = -\xi x_{NOx,i-1}^{ds} \eta_{NOx,i} + x_{NH3,i-1}^{ds} - x_{NH3,i}^{ds} + \varphi \quad (7)$$

with $\eta_{NOx,i}$ the NOx conversion efficiency of the i-th brick, $x_{NOX,i-1}^{ds}$ the NOx concentration of the previous brick, the NH3 concentration $x_{NH3,i-1}^{ds}$ of the previous brick, and a stoichiometric factor corresponding to the NH3 equivalents from the NOx conversion, and in particular in the range of (1:1.$\overline{3}$).

The method then continues in a step 250.

In a step 250, whether the equation (11) is satisfied for all of the bricks i of SCR catalyst 22 is checked:

$$\left(-\xi x_{NOx,i-1}^{ds} \eta_{NOx,i} + x_{NH3,i-1}^{ds} - x_{NH3}^{ds}\right) \leq \epsilon_{tol}. \quad (11)$$

wherein $e_{tol}$ is a suitable, specifiable tolerance threshold. This tolerance threshold can preferably be interpreted as a rate of change of the target NH3 individual fill levels $NH3_{soll}$, i.e., it indicates how much the fill levels are allowed to change in the defined stationary point. This may be determined in an application phase for the SCR catalyst 22.

If the tolerance threshold is not met for all of the bricks i, the method is continued again in step 220, wherein an adaptation of the NH3 filling levels for the current estimate (at the start of the method this is the start value) is carried out. This may be done, for example, by a Newton-based method. To do so, the derivative matrix (Jacobi matrix) of the function to be minimized for formula (11) must be calculated:

$$J = \left[\frac{\partial}{\partial m_{NH3,j}}\left(\frac{\partial m_{NH3,i}}{\partial t}\right)\right], i, j = 1, \ldots, n_b \text{ und } J \in \mathbb{R}^{n_b \times n_b} \quad (12)$$

The quotient of the function to be minimized and the Jacobi matrix determines the step size and direction of the adaptation of the current estimate according to the formula:

$$m_{NH3,i}^{[l]} = m_{NH3,i}^{[l-1]} - J^{-1}\left(\frac{\partial m_{NH3,i}}{\partial t}\right) \quad (13)$$

In the event that the condition from formula (11) is satisfied for all of the bricks i, the method is continued in a step 260.

In a step 260, the target NH3 individual fill levels are then combined to a target NH3 fill level NH3$_{soll}$ and the method may be continued in a step 270.

In a step 270, the determined desired target NH3 fill level is added to the dosing strategy and adjusted by means of a dosing strategy, preferably by means of a P regulation between the target and actual value. The proportion of the P regulator is added to the pilot amount.

The method can then be started from the beginning in Step 200 or terminated.

What is claimed is:

1. A method for exhaust aftertreatment of an internal combustion engine having at least one selective catalytic reduction ("SCR") catalyst supplied with exhaust gas of the internal combustion engine through an exhaust path, the method comprising:
   virtually dividing the at least one SCR catalyst into n-bricks ($n_b$) in a direction of flow of the exhaust gas;
   determining desired NH3 target fill levels (NH3$_{Soll,i}$) for the at least one SCR catalyst as a function of a desired target NOx conversion efficiency ($\eta_{NOx}$);
   assuming a steady state condition for the determination of the desired NH3 target fill levels (NH3$_{soll,i}$);
   determining the desired NH3 target fill levels (NH3$_{soll,i}$) for the at least one SCR catalyst by means of an inverse SCR model ($F^{-1}$) by means of a current NOx concentration (NOx$_{Us}$) upstream of the SCR catalyst, an SCR catalyst temperatures of the bricks ($T_{SCR,i}$), an exhaust mass flow (dmEG), an oxygen concentration ($O_2$), an exhaust pressure (p) upstream of the SCR catalyst and a desired target NOx conversion efficiency ($\eta_{NOx}$); and
   performing a regulation of the SCR catalyst as a function of the determined NH3 target fill level (NH3$_{soll}$).

2. The method of claim 1, wherein for the assumed steady state, a balancing of an input concentration and an output concentration of the SCR catalyst based on the NH3 fill level is described as follows:

$$\frac{\partial m_{NH3,i}}{\partial t} = 0 = -\xi x_{NOx,i-1}^{ds}\eta_{NOx,i} + x_{NH3,i-1}^{ds} - x_{NH3,i}^{ds},$$

with $\eta_{Nox,i}$ corresponding to the NOx conversion efficiency of the i-th brick, and $\xi$ corresponding to a stoichiometric factor corresponding to NH3 equivalents from the NOx conversion, and in a range of (1:1. 3).

3. The method of claim 1, further comprising:
   determining an NH3 dosing quantity as a function of a difference between the desired NH3 target fill level (NH3$_{soll}$) and a current NH3 fill level (NH3$_{1st}$) and dosed using an SCR injection system.

4. The method of claim 1, further comprising:
   determining or specifying the desired NOx conversion efficiency ($\eta_{NOx}$) from a grid as a function of the SCR catalyst temperature and/or exhaust mass flow (dm$_{EG}$).

5. The method of claim 1, wherein the inverse SCR model ($F^{-1}$) is determined using a reaction kinetic or a site-resolved model.

6. The method of claim 1, wherein the desired NH3 target fill level (NH3$_{soll}$) is composed of a sum of the desired NH3 target fill levels (NH3$_{soll,n_b}$) of the n virtual bricks.

7. The method of claim 1, wherein the regulation is performed on any virtual brick ($n_b$), including a first brick ($n_1$).

8. The method of claim 1, further comprising:
   determining a total NOx conversion efficiency ($\eta_{Nox,ges}$) of the at least one SCR catalyst as a function of the NOx conversion efficiencies ($\eta_{Nox,i}$) of individual virtual bricks according to the formula:

$$\eta_{NOx,ges} = 1 - \prod_1^{n_b}(1 - \eta_{NOx,i}).$$

9. The method of claim 4, wherein:
   two of the at least one SCR catalysts, including a first SCR catalyst and a second SCR catalyst, are arranged in a row in the direction of flow of the exhaust gas,
   the desired NOx conversion efficiency ($\eta_{NOx,Soll}$) is determined as a function of the state of the second SCR catalyst,
   an actual NOx conversion efficiency ($\eta_{NOx,1st}$) and/or actual NH3 individual fill levels ($m_{NH3,1st,i}$) and/or an actual NH3 total fill level ($m_{NOx,ges}$) are used for the determination.

10. The method of claim 1, wherein a computer program is configured to perform the method.

11. A non-transitory electronic storage medium with the computer program according to claim 10.

12. A device, comprising:
   a control unit configured to perform the method according to claim 1.

* * * * *